United States Patent [19]

Kawai et al.

[11] Patent Number: 5,284,712
[45] Date of Patent: Feb. 8, 1994

[54] CEMENT-CONTAINING CERAMIC ARTICLES AND METHOD FOR PRODUCTION THEREOF

[76] Inventors: Kazuyuki Kawai; Kazumasa Goto; Takayuki Shirai, all of c/o Inax Corporation No. 6, Koiehonmachi 3-chome, Tokoname, Aichi, Japan

[21] Appl. No.: 951,355

[22] Filed: Sep. 25, 1992

Related U.S. Application Data

[63] Continuation of Ser. No. 548,288, Jul. 3, 1990, abandoned, which is a continuation-in-part of Ser. No. 260,459, Oct. 20, 1988, abandoned.

[30] Foreign Application Priority Data

Dec. 26, 1987 [JP] Japan ................. 62-331776

[51] Int. Cl.⁵ ............... B28B 11/06; C03C 1/00; C04B 33/34; C04B 35/00
[52] U.S. Cl. ............... 428/454; 264/60; 264/62; 264/63; 264/110; 264/112; 264/113; 264/122; 264/125; 264/131; 264/133; 264/332; 264/333; 428/688; 428/703; 501/32; 501/122; 501/124; 501/128; 501/130; 501/131; 501/141
[58] Field of Search .......... 264/60, 62, 122, 125, 264/133, 332, 333, 63, 110, 112, 113, 131; 501/32, 122, 124, 128, 130, 131, 141; 428/688, 703, 454

[56] References Cited

U.S. PATENT DOCUMENTS

| | | | |
|---|---|---|---|
| 2,562,477 | 7/1951 | Ramsay | 264/273 X |
| 3,079,267 | 2/1963 | Konrad et al. | |
| 3,689,611 | 9/1972 | Hardy et al. | 264/62 X |
| 3,917,489 | 11/1975 | Waters, Jr. | |
| 3,928,059 | 12/1975 | Ferrigno | 264/117 X |
| 4,119,470 | 10/1978 | Hums | |
| 4,185,066 | 1/1980 | Temple | 264/333 X |
| 4,244,745 | 1/1981 | Havranek et al. | |
| 4,271,109 | 6/1981 | Boyce | 264/63 |
| 4,318,996 | 3/1982 | Magder | 501/84 |
| 4,407,769 | 10/1983 | Harada et al. | 264/60 |
| 4,452,635 | 6/1984 | Noshi et al. | 106/628 |
| 4,524,100 | 6/1985 | Shimizu et al. | 264/60 X |
| 4,572,862 | 2/1986 | Ellis | 106/688 X |
| 4,595,664 | 6/1986 | Nishino et al. | |
| 4,656,146 | 4/1987 | Schlett et al. | |
| 4,663,104 | 5/1987 | Ito et al. | 264/62 X |
| 4,678,683 | 7/1987 | Pasco et al. | 501/96 X |
| 4,680,279 | 7/1987 | Kleeb | |

FOREIGN PATENT DOCUMENTS

| | | | |
|---|---|---|---|
| 50171 | 4/1982 | European Pat. Off. | |
| 78046 | 5/1983 | European Pat. Off. | |
| 323009 | 7/1989 | European Pat. Off. | |
| 1168631 | 12/1958 | France | |
| 9109 | 1/1976 | Japan | 264/62 |
| 82314 | 7/1976 | Japan | 264/333 |
| 57934 | 4/1984 | Japan | 264/333 |
| 215567 | 10/1985 | Japan | |
| 172263 | 7/1989 | Japan | |
| 80363 | 3/1990 | Japan | |
| 1330298 | 9/1973 | United Kingdom | 264/62 |

*Primary Examiner*—Karen Aftergut
*Attorney, Agent, or Firm*—Lerner, David, Littenberg, Krumholz & Mentlik

[57] ABSTRACT

The occurrence of efflorescence has been reduced or eliminated in ceramic articles formed from a novel vitreously bonded cement-containing composition. The articles also exhibit improved strength, reduced firing shrinkage and increased frost resistance. The articles are produced by combining hydraulic cement containing calcium silicate and/or calcium aluminate components, vitrifiable inorganic powders forming molten liquid-flowing substances, and reactive or sinterable mineral powders selected from the group consisting of magnesium silicates, aluminum silicates and mixtures thereof; combining the ingredients with water to form a mixture; molding the mixture into an article; hardening the article by hydration; and firing the molded article to a maximum temperature of between about 1000° C. to 1400° C.

26 Claims, No Drawings

CEMENT-CONTAINING CERAMIC ARTICLES AND METHOD FOR PRODUCTION THEREOF

This is a continuation of U.S. application Ser. No. 07/548,288 filed Jul. 3, 1990, now abandoned, which is a continuation-in-part application of U.S. application Ser. No. 07/260,459, filed Oct. 20, 1988, now abandoned.

BACKGROUND OF THE INVENTION

1. Field of the Invention

This invention relates to novel high-strength cement-containing ceramic articles decreased in or prevented from efforescence and a method for production thereof. The articles consist essentially of inorganic hydraulic cement such as portland cement, and heat-vitrifiable inorganic powder, as well as silicate mineral powder such as magnesium silicate minerals and/or aluminum silicate minerals. The ceramic articles according to the present invention are substantially prevented from efflorescence caused by the vitrifiable component and cement component, has large frost resistance, and is often increased in strength by the side effect of the silicate mineral component contained therein. Incidentally, the moldability and shape retention of green molded articles as well as the shrinkage and deformation of the articles in the course of firing are markedly improved due to the hydraulic cement component contained therein. The present ceramic articles are, for example, useful for building parts or materials.

2. Prior Art

Conventional pottery or porcelain articles have been produced by molding clay materials and firing the molded articles. However, there have been many problems in the moldability and in shape retention of the green molded articles, and in shrinkage and deformation during the course of firing. These problems have been considered unavoidable.

In the course of research, the present inventors have developed a method which comprises molding an aqueous blend containing hydraulic cement, aggregate and a vitrifiable component such as glass powder and containing no silicate mineral powder mentioned above; substantially hydrating the cement component; and then firing the molded article to a temperature of 900° C. or more. Efflorescence due to the glass powder and cement component, however, markedly appeared on the surfaces of the resulting articles in an amount of about 20 to 50% of the whole surface area of the article. It was also desired to further increase the strength of the articles A method has been known for producing a cement concrete article (e.g. Laid-open European Patent Application No. 80303696.1, which comprises molding an aqueous blend of hydraulic cement, aggregate and preferably a calcium compound, hydrating the molded article, firing the hydrated article at a temperature lower than 900° C., and then rehydrating the fired article. The ceramic article of the present invention, however, is quite different from such rehydrated concrete articles in strength, components and operations; the bending strength of such concrete articles being about 13 MPa. Moreover, it is noted that the inefficient step of rehydration mentioned above is not needed in the present invention.

SUMMARY OF THE INVENTION

The main object of the present invention is to provide cement-containing ceramic articles and the method for production thereof wherein the above-mentioned problems were substantially solved. Other objects and features of the present invention will become clear in the following description.

According to the present invention, there is provided a method for producing a cement-containing high-strength ceramic article exhibiting not more than about 3% of efflorescence for the whole surface area thereof and less than about 2% of firing shrinkage, comprising the steps of:

molding a blended mixture comprising by weight 100 parts of an inorganic hydraulic cement containing calcium silicate or/and calcium aluminate components, about 50~300 parts of a heat-vitrifiable inorganic powder forming molten-vitrified liquid-flowing substances at a maximum firing temperature not lower than about 1000° C. and lower than about 1400° C., water, and about 20–400 parts of a silicate mineral powder having reacting and/or sintering properties and forming no molten liquid-flowing substances at said maximum firing temperature selected from the group consisting of magnesium silicate minerals, aluminium silicate minerals, and mixtures thereof having the above mentioned thermal properties;

preliminarily hardening the molded article by hydration to form cement-based skeletons; and then firing the hydrated article to said maximum firing temperature; whereby the vitrifiable powder is caused to fuse into a liquid-flowing state and substantially permeate into the interstices of the heat-dehydrated cement-containing article to vitreously bond the article, efflorescence is decreased in the presence of the silicate mineral powder, and firing shrinkage is reduced due to the cement-based skeletons in the course of firing.

The resulting ceramic article is decreased in or substantially prevented from efflorescence, and also has improved strength, shrinkage and deformation properties resulting from firing, frost resistance, heat insulation, etc. The bending strength of the resulting ceramic article is more than about 16 Mpa and normally about 20 MPa or more.

In the present invention, a magnesium silicate mineral powder such as serpentine, talc or mixtures thereof is preferably used to increase the strength of the ceramic articles (e.g. 22 MPa or more, preferably 24 MPa or more), because a high-strength reaction product thereof with a calcium compound is readily produced in the firing.

Incidentally, the shrinkage and deformation of the fired article are substantially prevented, because the cement component forms skeletons in the hydrated molded article to be fired and maintains the shapes of the articles in the course of firing.

DETAILED DESCRIPTION OF THE INVENTION

(1) Raw Materials

The inorganic hydraulic cement means inorganic powder containing calcium silicate or/and calcium aluminate components to be strongly bonded together in the presence of water; and includes, for example, portland cement, alumina cement, synthetic calcium aluminate cement, blast furnace cement, other mixed cement comprising portland cements and mixtures thereof. For example, portland cement comprises a major amount of calcium silicate components and a minor amount of aluminate components; and alumina cement comprises a major amount of calcium aluminate components and a minor amount of calcium silicate components. The calcium silicate and calcium aluminate components produce dense crystalline skeletons composed of very fine hydrated crystals in the course of the preliminary hydration of molded articles. The dense crystalline skeletons thus produced maintain the shapes of the molded articles even when the articles are fired to a maximum temperature of about 1000° C. to 1400° C., whereby firing shrinkage is unexpectedly reduced to less than 2%. Incidentally, lime powder or plaster (i.e. gypsum) powder, which may be classified as a hydraulic cement in a broader sense and does not contain calcium silicate and/or calcium aluminate components, is weak in binding strength and also decomposes at a firing temperature of about 900° C. or 930° C., and thus can not be used in the present invention because of deformation and/or large firing shrinkage (e.g. about 5 to 10%) at such a firing temperature higher than 1000° C.

As aggregate which can be optionally used in the present invention, it is generally preferred to use aggregate exhibiting no large expansion upon firing, such as chamotte. There can also be used conventional aggregate for cement concrete such as river sand, sea sand, silica, andesite, basalt, and hard sandstone.

The heat-vitrifiable inorganic powder having a fusing temperature lower than the following silicate mineral powder, is an inorganic powder forming molten-vitrified liquid-flowing substances in the course of firing; and includes, for example, glass powder, frit, feldspar powder, volcanic balloon, volcanic ash, and other heat-vitrifiable igneous rock powder. The mean particle size of the powder is generally less than about 200 microns and normally less than about 100 microns. Glass powder, feldspar powder or mixtures thereof are normally used in the present invention. Incidentally, glass materials containing alkali metal and/or alkaline-earth metal components are normally used for the glass powder, because of low cost and suitable fusing properties. Silica glass powder consisting of silica alone can not be used because of high fusing temperature (e.g. 1650° C.).

The silicate mineral powder having a fusing temperature higher than the above-mentioned vitrifiable powder such as magnesium silicates or aluminum silicates desirably consists of fine particles having a mean particle size of generally about 100 microns or less and normally about 50 microns or less (e.g. about 5~50 microns), in view of its sintering or reacting properties at a high firing temperature. The silicate mineral powder should be clearly distinguished from coarse aggregate for cement concrete which has no substantial sintering or reacting properties. Incidentally, the silicate mineral powder to be used is normally of natural origin, although mixture of synthetic mineral powders containing similar components can also be used in the present invention.

The magnesium silicate mineral powder consisting essentially of a silicate component and a magnesium oxide component includes, for example, talc powder, serpentine powder, chlorite powder, and mixtures thereof. Serpentine powder, talc powder or mixtures thereof are normally used in the present invention.

The aluminum silicate mineral powder consisting essentially of a silicate component and an aluminum oxide component includes, for example, agalmatolite powder (e.g. pyrophillite) and clay powder such as kaoline or sericite, and mixtures thereof. Agalmatolite or mixtures thereof with other aluminum silicates are normally used in the present invention.

Incidentally, active silica powder having a fusing temperature higher than the above-mentioned vitrifiable powder, such as finely divided non-amorphous silica and amorphous silica, may be used together with the above-mentioned silicate mineral powder to further improve strength and efflorescence, but the silica powder if used in the absence of the silicate minerals is less effective in decreasing the efflorescence.

(2) Quantities of the Raw Materials

A preferable range of the raw materials by weight are shown in the following tables. The raw materials are blended with sufficient water for molding and hydration of the cement (e.g. about 0.1~0.5 parts by weight of water per part of the cement), and are molded into green molded articles.

| General Range of Raw Materials (Parts by weight) | |
| --- | --- |
| Hydraulic inorganic cement | 100 |
| Vitrifiable inorganic powder | about 50~300 |
| Silicate mineral powder | about 20~400 |
| | (preferably about 50~300) |
| Aggregate | about 500~0 |
| Typical Range of Raw Materials (Parts by weight) | |
| Hydraulic inorganic cement | 100 |
| (e.g. portland cement) | |
| Vitrifiable inorganic powder | about 50~200 |
| (e.g. glass powder) | (e.g. about 100) |
| Magnesium silicate mineral powder | about 50~200 |
| (e.g. serpentine) | (e.g. about 100) |
| Aluminum silicate mineral powder | about 5~150 |
| (e.g. agalmatolite) | (normally about 10~100, e.g. about 50) |
| Aggregate (e.g. chamotte) | about 300~0 |
| | (e.g. about 150) |

Incidentally, the quantities by weight of the raw materials are generally in the range of 100 parts of inorganic cement and not more than about 600 parts in the total of other raw materials.

(3) Green Molded Articles

The above mentioned raw materials are blended with water, kneaded and molded into desired articles. From the viewpoint of moldability and material cost, it is desired to incorporate the same or more quantity by weight of aggregate as the cement. Conventional additives can be added as necessary to the raw materials, such as binder, water-decreasing agent, plasticizer, and dispersing agent. Also, heat-resistant reinforcing inorganic fibers can be incorporated in the raw materials to increase the strength of the ceramic articles.

The blended materials are molded into desired articles by conventional methods such as press molding, vibration press molding, extrusion, cast molding, press-dewatering molding, screen molding, spray molding, or roll molding. In general, it is suitable to employ press-dewatering molding for stronger ceramic articles and extrusion molding for the articles having complicated cross-sectional shapes.

The molded articles are preliminarily hardened by hydration of the cement component by allowing the articles to stand in steam or air atmosphere for several hours to several days. The hydrated articles are then fired under the following conditions. Incidentally, glazed ceramic articles are readily obtained by coating a glaze agent suitable for the firing conditions on the desired surfaces of the hydrated articles and firing the coated articles.

(4) Firing

In the course of firing, the vitrifiable powder in the molded article is caused to fuse into a liquid-flowing state and substantially permeate into the interstices of the heat-dehydrated cement-containing article, to vitreously bond the article. The cement-containing hydrated article forms cement-based skeletons, and thus shrinkage upon sintering, which has not been avoidable in conventional ceramic articles, can be substantially prevented by the skeletons (for example, the shrinkage is less than 2% and normally not more than about 1% by volume with respect to the molded article before firing in the present ceramic article, whereas about 7 to 10% in conventional pottery or porcelain). Incidentally, the cement component dehydrated by the firing remains without rehydration and substantially serves as aggregate in the present ceramic articles. The cement component dehydrated in the firing is not substantially rehydrated, because the cement component fired at such a high temperature loses rehydration properties and the cement component is substantially covered with the vitrified component.

In addition to the use of the silicate mineral powder component, it has been found that firing at a maximum temperature of 1000° C. or more, normally 1050° C. and preferably 1100° C. or more is needed to decrease efflorescence due to the vitrifiable powder component and the cement component.

Thus, the firing according to the present invention is conducted for more than several hours until the molded article to be fired reaches a desired maximum temperature and then is substantially cooled; the maximum firing temperature being about 1000° C., or more, generally higher than about 1000° C., preferably about 1050° C. or more and more preferably about 1100° C. or more (e.g. about 1100°~1250° C.) and not higher than about 1350° C., and generally lower than about 1400° C. The residence time of the articles at the maximum temperature is such a time that the vitrifiable powder is caused to fuse into a liquid-flowing state and substantially permeate into the interstices of the heat-dehydrated cement-containing articles; for example about 5 minutes or more and preferably about 10 minutes or more at about 1000° C. or more. Incidentally, it is difficult to achieve the features of the present invention at a conventional firing temperature of about 900° to 950° C. or less. The firing conditions are readily carried out, for example, by means of a roller hearth kiln or a tunnel kiln.

If the maximum firing temperature is over 1400° C. for a substantial period of time, the cement-based skeletons for reducing or protecting the firing shrinkage will be damaged and large firing shrinkage will sometimes take place. If the maximum temperature is over e.g. 1450° C., some silicate mineral powder having a fusing temperature higher than the vitrifiable powder components will be fused into a substantially liquid-flowing state and will also contribute to firing shrinkage. It is necessary to conduct the firing at a maximum firing temperature between about 1000° and 1400° C., at which temperature the silicate mineral powder does not form substantially liquid-flowing fused substances. Thus, the maximum firing temperature is preferably in the range of about 1050 and 1300° C. from the viewpoints of thermal economy and reduction in efflorescence and shrinkage.

(5) Efflorescence

According to the present invention, efflorescence appearing on the surfaces of vitreously bonded ceramic articles is decreased or substantially prevented. For the whole surface area of the ceramic article, (a) the surface area of efflorescence which is considered to be commercially feasible is 3% or less, (b) the area of efflorescence practically desirable is 1% or less, and (c) the area of efflorescence practically satisfactory is 0.5% or less.

EMBODIMENTS

Example 1 (Comparative)

In parts by weight, ordinary portland cement 30 parts, glass powder 30 parts, porcelain chamotte aggregate (particle size less than 2 mm) 40 parts, water 16 parts and methylcellulose 1.2 parts were kneaded, and extruded into test pieces of 50×100×10 mm (thick). The test pieces were preliminarily hydrated and dried in air at 105° C., and then fired in a roller hearth kiln to the maximum temperature of 850° C. for 20 minutes or to 1050° C. for 20 minutes, respectively. Incidentally, the bending strength of the resulting ceramic articles having dimensions of 100×50×10 mm was measured under the conditions of a span 90 mm and a loading velocity 2 mm/minute according to Japanese Industrial Standards JIS A5209.

The ceramic article fired to 850° C. showed a bending strength of 11.4 MPa, a firing shrinkage of 0.8% and an efflorescence area of about 40%. The ceramic article fired to 1050° C. showed a bending strength of 21.7 MPa, a firing shrinkage of 0.9% and an efflorescence area of about 20%. It has been demonstrated that the ceramic articles are not feasible in view of too much efflorescence.

Example 2

In parts by weight, agalmatolite powder (aluminum silicate mineral) 20 parts, ordinary portland cement 20 parts, glass powder 20 parts, porcelain chamotte aggregate (particle size less than 2 mm) 40 parts, water 17 parts and methylcellulose 1 part were kneaded, and extruded into test pieces of 50×100×10 mm (thick). The test pieces were preliminarily hydrated and dried in air at 105° C., and then fired in a roller hearth kiln to the maximum temperature of 850° C. for 20 minutes or to 1050° C. for 20 minutes, respectively. The fired articles were then soaked in water for 30 minutes and treated for 7 days in saturated steam at 60° C. The bending strength of the fired ceramic articles and the steam-treated ceramic articles was measured respectively.

The ceramic article fired to 1050° C. showed an efflorescence area of about 2%, a firing shrinkage of 0.8%, and a bending strength of the fired-cooled article of 22.4 MPa and that of the steam-treated article of 22.8 MPa. It has been demonstrated that the degree of efflorescence is commercially feasible, and the strength of the ceramic article does not change even after the steam treatment.

Incidentally, the ceramic article fired to for comparison showed an efflorescence area of about 5%, a firing shrinkage of 0.6%, and a bending strength of the fired-cooled article of 12.8 MPa and that of the steam-treated article of 15.8 MPa. The ceramic article was not commercially feasible with respect to both efflorescence and strength.

Example 3

Example 2 was repeated except that there were used, as the raw materials in parts by weight, serpentine powder (magnesium silicate mineral) 20 parts, ordinary portland cement 20 parts, glass powder 20 parts, porcelain chamotte aggregate (particle size less than 2 mm) 40 parts, water 17 parts and methylcellulose 1 part.

The resulting ceramic article fired to 1050° C. showed an efflorescence area of about 2.5%, a firing shrinkage of 1.0%, and a bending strength of the fired-cooled article of 24.2 MPa and that of the steam-treated article of 24.0 Mpa. It has been demonstrated that the degree of efflorescence is commercially feasible, and the strength of the ceramic article does not change even after the steam treatment.

Incidentally, the ceramic article fired to 850° C. for comparison showed an efflorescence area of about 7%, a firing shrinkage of 0.6%, and a bending strength of the fired-cooled article of 14.2 MPa and that of the steam-treated article of 16.0 MPa. The ceramic article was not commercially feasible with respect to both efflorescence and strength.

Example 4

The following raw materials in parts by weight were used.

| Ordinary portland cement | 100 |
| Serpentine powder (less than 150 mesh) | 50 |
| Glass powder (less than 100 mesh) | 125 |
| Agalmatolite powder (less than 200 mesh) | 25 |
| Colored chamotte aggregate (less than 16 mesh) | 200 |

The above-mentioned raw materials, methylcellulose and water were kneaded, extruded into a sheet of 50 mm wide and 10 mm thick, and cut to a length of 100 mm to prepare test pieces. The test pieces were preliminarily hydrated, dried in air at 105° C., and fired to a maximum temperature of 1200° C. for 20 minutes in a roller hearth kiln.

The resulting ceramic articles showed no efflorescence, a bending strength of 26 MPa and a firing shrinkage of 0.8%, as well as bulk density of 1.86 g/cc, thermal conductivity (corresponding to heat insulation) of 0.84 W/m.k, and no change in a frost resistance test (i.e. 500 cycles at −20° C. and +20° C.). Thus, it has been demonstrated that the ceramic article is improved in bulk density, firing shrinkage and heat insulation in comparison with conventional porcelain articles; and in bulk density, strength, heat insulation and thermal resistance in comparison with conventional cement concrete articles.

Example 5

Glaze agent slurry was spray-coated at 50 mg per square centimeter in solid weight on the upper surfaces of the test pieces preliminarily hydrated and dried as prepared in Example 4. Incidentally, the glaze agent consisted, in dry weight %, of feldspar 40 parts, calcium carbonate 10 parts, zinc oxide 5 parts, talc 25 parts, silica sand 10 parts and silica-containing kaoline 10 parts. The coated test pieces were fired as in Example 4 to obtain glazed ceramic articles having no efflorescence.

Actions and Effects of the Invention

Efflorescence appearing on vitreously bonded ceramic articles is considered to be mainly caused by (a) water-soluble basic components in the heat-vitrifiable material, (b) alkaline metal compounds formed by the reaction of the basic component in the vitrifiable material with an acid component in cement, and (c) water-soluble basic compounds such as CaO derived from fired cement.

In the present invention, the cement and vitrifiable material are fired in the presence of the aluminum silicate mineral and/or magnesium silicate mineral to a temperature of 1000° C. or more and preferably 1100° C. or more, whereby it has been found that the above-mentioned causes (a), (b) and (c) of efflorescence can be advantageously decreased and also the strength of the resulting ceramic article can be enhanced.

The reasons why the factors can be substantially eliminated have not been fully clarified, but are considered to be due to the following reasons. The factor (a) can be solved because the water-soluble basic components in the vitrifiable material are reacted at the high firing temperature and practically fixed in the resulting glass. The factor (b) can be solved because basic salts such as sodium sulfate derived from the vitrifiable material and cement react with active silicate derived from the silicate minerals to form stable compound such as $Na_2O \cdot mCaO \cdot nSiO_2$. The above-mentioned factor (c) can be solved because the basic compounds such as CaO derived from cement react at the high firing temperature with the aluminum silicate mineral and/or magnesium silicate mineral to form stable compounds such as $CaO \cdot mAl_2O_3 \cdot nSiO_2$ and/or $CaO \cdot mMgO \cdot nSiO_2$. Incidentally, the present ceramic articles are enhanced in strength, because high-temperature reaction products contained in the ceramic articles, such as sintered clay minerals or the above-mentioned magnesium oxide-containing compounds, are of high strength.

Thus, the present ceramic articles are advantageously provided with a decrease in efflorescence, increase in strength, and a reduction in or prevention of firing shrinkage and deformation due to cement-based skeletons, etc.

Moreover, both relatively fine pores derived from the cement concrete and relatively coarse pores derived from molten vitrifiable materials are uniformly produced in the resulting ceramic articles, because the cement concrete-based skeletons are maintained and the vitrifiable inorganic powder is fused in the course of firing the green molded articles. Because of such substantially uniform pores, the present ceramic articles are also provided with an increase in frost resistance, increase in heat insulation, decrease in bulk density, etc. Thus, the present ceramic articles are, for example, useful for large-size building parts such as wall materials and tiles.

What is claimed is:

1. A method for producing a high-strength ceramic article exhibiting about 3% or less surface efflorescence, comprising the steps of:

blending a mixture comprising 100 parts by weight of an inorganic hydraulic cement containing at least one of calcium silicate and calcium aluminate components, about 50–300 parts by weight of a heat-vitrifiable inorganic powder forming vitrified liquid-flowing substances at a firing temperature between about 1000° C. and about 1400° C., and about 20-400 parts by weight of a silicate mineral powder having reacting or sintering properties at said firing temperature and forming substantially no liquid-flowing substances at said firing temperature, said silicate mineral powder being selected from the group consisting of magnesium silicate minerals, aluminum silicate minerals and mixtures thereof, combining said blended mixture with water to form a moldable composition, molding said moldable composition to form a molded article, preliminarily hardening said molded article by hydration to form a cement-based skeleton network in said article, and then firing said hydrated article to said firing temperature to react or sinter said silicate mineral powder while forming substantially no liquid-flowing substances therefrom and to fuse said heat-vitrifiable powder into a liquid-flowing state which substantially permeates into said skeleton network to vitreously bond said article and thus form said high-strength ceramic article exhibiting about 3% or less surface efflorescence.

2. The method as claimed in claim 1, wherein said silicate mineral powder comprises a magnesium silicate mineral.

3. The method as claimed in claim 2, wherein said magnesium silicate mineral comprises mineral powder selected from the group consisting of serpentine, talc, chlorite, and mixtures, thereof.

4. The method as claimed in claim 2, further comprising the step of coating select surfaces of said preliminarily hardened molded article with a glaze agent prior to said firing step.

5. The method as claimed in claim 1, wherein said silicate mineral powder comprises magnesium silicate minerals which are selected from the group consisting of serpentine, talc, chlorite and mixtures thereof.

6. The method as claimed in claim 1, wherein said silicate mineral powder comprises aluminum silicate minerals which are selected from the group consisting of agalmatolite, clay and mixtures thereof.

7. The method as claimed in claim 6, further comprising the step of coating select surfaces of said preliminarily hardened molded article with a glaze agent prior to said firing step.

8. The method as claimed in claim 1, further comprising the step of coating select surfaces of said preliminarily hardened molded article with a glaze agent prior to said firing step.

9. The method as claimed in claim 1, wherein said silicate mineral powder comprises both a magnesium silicate mineral and an aluminum silicate mineral.

10. The method as claimed in claim 9, wherein said magnesium silicate mineral comprises a first mineral powder selected from the group consisting of serpentine, talc, chlorite and mixtures thereof, and said aluminum silicate mineral comprises a second mineral powder selected from the group consisting of agalmatolite, clay and mixtures thereof.

11. The method as claimed in claim 1, wherein said heat-vitrifiable inorganic powder is selected from the group consisting of glass powder, feldspar powder and mixtures thereof.

12. The method as claimed in claim 1, wherein said firing temperature is between about 1050° C. and about 1400° C.

13. A high-strength ceramic article produced according to the method of claim 1.

14. The high-strength ceramic article as claimed in claim 13, further comprising a glazed layer formed on select surfaces thereof.

15. The high-strength ceramic article as claimed in claim 13, wherein said magnesium silicate minerals comprise a first mineral powder selected from the group consisting of serpentine, talc, chlorite and mixtures thereof, and said aluminum silicate minerals comprise a second mineral powder selected from the group consisting of agalmatolite, clay and mixtures thereof.

16. The high-strength ceramic article as claimed in claim 15, further comprising a glazed layer formed on select surfaces thereof.

17. The method as claimed in claim 1, wherein said silicate mineral powder has a mean particle size of not mote than about 100 microns.

18. The method as claimed in claim 1, wherein said blended mixture further comprises an active silica powder having a fusing temperature which is higher than said firing temperature.

19. A method for producing a high-strength ceramic article exhibiting about 3% or less surface efflorescence, comprising the steps of:

blending a mixture comprising 100 parts by weight of an inorganic hydraulic cement containing at least one of calcium silicate and calcium aluminate components, and a combination of inorganic powders, said combination including about 50-300 parts by weight of a heat vitrifiable inorganic powder forming vitrified liquid-flowing substances at a predetermined firing temperature, and about 20-400 parts by weight of a powdered material having reacting or sintering properties at said predetermined firing temperature and forming substantially no liquid-flowing substances at said predetermined firing temperature, said powdered material being selected from the group consisting of magnesium silicate minerals, aluminum silicate minerals and mixtures thereof, combining said blended mixture with water to form a moldable composition, molding said moldable composition to form a molded article, preliminarily hardening said molded article by hydration to form a cement-based skeleton network in said article, and then firing said hydrated article to said predetermined firing temperature of about 1000° C. and about 1400° C. to react or sinter said silicate mineral powder while forming substantially no liquid-flowing substances therefrom and to fuse said heat-vitrifiable powder into a liquid-flowing state which substantially permeates into said skeleton network to vitreously bond said article and thus form said high-strength ceramic article exhibiting about 3% or less surface efflorescence.

20. The method as claimed in claim 19, wherein said blended mixture further comprises an aggregate, said aggregate being present in an amount less than about 500 parts by weight.

21. The method as claimed in claim 19, wherein said powdered material has a mean particle size of not more than about 100 microns.

22. The method as claimed in claim 19, wherein said powdered material comprises a magnesium silicate mineral.

23. The method as claimed in claim 19, wherein said blended mixture further comprises an active silica powder having a fusing temperature which is higher than said predetermined firing temperature.

24. A method for producing a high-strength ceramic article exhibiting a low surface efflorescence of about 3% or less, comprising the steps of:

blending a mixture comprising an inorganic hydraulic cement, a heat-vitrifiable inorganic powder forming vitrified liquid-flowing substances at a firing temperature between about 1000° C. and about 1400° C., and a silicate mineral powder having reacting or sintering properties at said firing temperature and forming substantially no liquid-flowing substances at said firing temperature, said silicate mineral powder being selected from the group consisting of magnesium silicate minerals, aluminum silicate minerals and mixtures thereof, said silicate mineral powder having a means particle size of not more than about 100 microns, combining said blended mixture with water to form a moldable composition, molding said moldable composition to form a molded article, preliminarily hardening said molded article by hydration to form a cement-based skeleton network in said article, and then firing said hydrated article to said firing temperature to react or sinter said silicate mineral powder while forming substantially no liquid-flowing substances therefrom and to fuse said heat-vitrifiable powder into a liquid-flowing state which substantially permeates into said skeleton network to vitreously bond said article, whereby said reaction or sintering of said silicate mineral powder contributes to said low surface efflorescence appearing on said fired high-strength ceramic article.

25. The method as claimed in claim 24, wherein said blended mixture further comprises an active silica powder having a fusing temperature which is higher than said firing temperature.

26. A high-strength ceramic article produced according to the method of claim 24.

* * * * *

UNITED STATES PATENT AND TRADEMARK OFFICE
CERTIFICATE OF CORRECTION

PATENT NO. : 5,284,712
DATED : February 8, 1994
INVENTOR(S) : Kawai et al.

It is certified that error appears in the above-indentified patent and that said Letters Patent is hereby corrected as shown below:

```
On the title  page in the ABSTRACT, line 15, "to" should read
    --and--.
Column 1, line 37, delete "in" (second occurrence).
Column 1, line 53, "cles" should read --cles.--.
Column 1, line 56, "," should read --)--.
Column 2, line 45, "Mpa" should read --MPa--.
Column 3, line 1, "cement" should read --cements--.
Column 3, line 1, "cements" should read --cement--.
Column 3, line 31, "powder" should read --powder,--.
Column 3, line 48, "powder" should read --powder,--.
Column 3, lines 50 and 51, "powder" should read --powder,--.
Column 3, line 50, "silicates" (second occurrence) should
    read --silicates,--.
Column 3, line 60, "though" should read --though a--.
Column 6, line 66, "to" should read --to 850°C--.
Column 7, line 17, "Mpa" should read --MPa--.
Column 8, line 38, "strength," should read --strength--.
Column 10, line 21, "mote" should read --more--.
```

Signed and Sealed this

Twelfth Day of July, 1994

BRUCE LEHMAN

Attest:

Attesting Officer     Commissioner of Patents and Trademarks